(12) United States Patent
Buer

(10) Patent No.: US 8,996,885 B2
(45) Date of Patent: Mar. 31, 2015

(54) SECURE VIRTUAL MACHINE MANAGER

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1363 days.

(21) Appl. No.: 12/573,029

(22) Filed: Oct. 2, 2009

(65) Prior Publication Data

US 2010/0115291 A1     May 6, 2010

Related U.S. Application Data

(60) Provisional application No. 61/102,198, filed on Oct. 2, 2008.

(51) Int. Cl.
| | | |
|---|---|---|
| *G06F 11/30* | (2006.01) | |
| *G06F 12/14* | (2006.01) | |
| *G06F 21/53* | (2013.01) | |
| *G06F 21/60* | (2013.01) | |
| *G06F 21/72* | (2013.01) | |

(52) U.S. Cl.
CPC .............. *G06F 21/53* (2013.01); *G06F 21/602* (2013.01); *G06F 21/72* (2013.01)
USPC .......................................... 713/192; 713/193

(58) Field of Classification Search
None
See application file for complete search history.

(56) References Cited

U.S. PATENT DOCUMENTS

| | | | |
|---|---|---|---|
| 5,896,499 | A | 4/1999 | McKelvey |
| 8,190,908 | B2 * | 5/2012 | Jazayeri et al. ............... 713/186 |
| 2005/0076228 | A1 | 4/2005 | Davis et al. |
| 2005/0132217 | A1 | 6/2005 | Srinivasan et al. |
| 2006/0020781 | A1 | 1/2006 | Scarlata et al. |
| 2006/0085844 | A1 * | 4/2006 | Buer et al. ........................ 726/4 |
| 2006/0123056 | A1 * | 6/2006 | Darbha et al. ............. 707/104.1 |
| 2006/0206726 | A1 | 9/2006 | Wasson et al. |
| 2007/0094719 | A1 * | 4/2007 | Scarlata ............................ 726/9 |
| 2008/0104416 | A1 | 5/2008 | Challener et al. |
| 2008/0263363 | A1 * | 10/2008 | Jueneman et al. ............ 713/184 |

FOREIGN PATENT DOCUMENTS

| | | |
|---|---|---|
| CN | 1997955 A | 7/2007 |
| EP | 1 975 830 A1 | 10/2008 |

OTHER PUBLICATIONS

European Search Report, for European Patent Appl. No. 09 01 2529, completed Jan. 7, 2010, The Hague, 3 pgs.

* cited by examiner

*Primary Examiner* — Fatoumata Traore
(74) *Attorney, Agent, or Firm* — Sterne, Kessler, Goldstein & Fox P.L.L.C.

(57) ABSTRACT

Secure processing systems providing host-isolated security are provided. An exemplary secure processing system includes a host processor and a virtual machine instantiated on the host processor. A virtual unified security hub (USH) is instantiated on the virtual machine to provide security services to applications executing on the host processor. The virtual USH may further include an application programming interface (API) operable to expose the security services to the applications. A further exemplary secure processing system includes a host processor running a windows operating system for example, a low power host processor, and a USH processor configured to provide secure services to both the host processor and the low power host processor isolating the secure services from the host processor and the low power processor. The USH processor may also include an API to expose the security services to applications executing on the host processor and/or the low power host processor.

63 Claims, 8 Drawing Sheets

SECURE VIRTUAL MACHINE MANAGER

CROSS REFERENCE TO RELATED APPLICATIONS

This application claims benefit to U.S. Provisional Application 61/102,198 filed Oct. 2, 2008, entitled "Secure Virtual Machine Manager," which is incorporated herein by reference in its entirety.

FIELD OF THE INVENTION

This application relates generally computer security and more specifically to host-isolated security.

BACKGROUND OF THE INVENTION

A typical personal computer (PC) includes a host, memory, and user input. The majority of PCs today run Windows on an Intel processor. These systems are referred to as Wintel systems. Wintel systems have security weaknesses that are popular targets for hackers. Therefore, vendors and users are continual trying to develop techniques to make these systems more secure.

Many systems, including Wintel systems, provide encrypted storage where the user and system can store data. When the system is at rest (i.e., data not being used), the data is protected in the encrypted storage. However, the data may be retrieved from the encrypted storage and used by an application running on the host. As soon as the data is removed from the secure storage, the data becomes vulnerable. This unsecure location is where sensitive data is attacked.

What is therefore needed are systems and methods for providing a host isolated security environment in which security services are run and data is stored in a secure trusted domain, isolated from the unsecure host.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
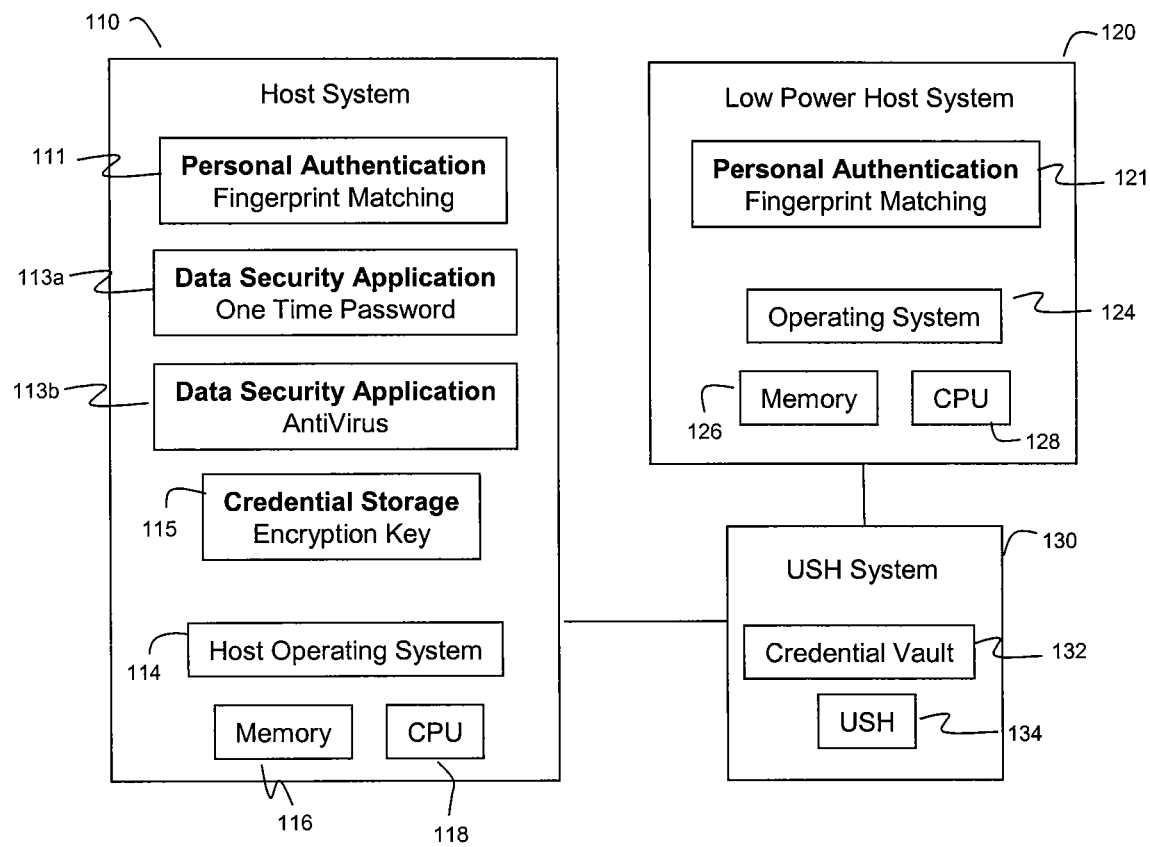
FIG. 1 depicts a system having dual hosts and a separate secure processor.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION 1.0 Architectural Embodiments 1.1 Hardware-Based Unified Security Hub Many computer systems today include multiple processors. These multi processor systems present unique security challenges to administrators and users. FIG. 1 depicts a system 100 having dual host processors and a separate secure processor. System 100 includes three physical processors—a host 110 for performing traditional windows processing, a host 120 for performing low power processing, and secure processor 130.

Host system 110 may be based on an Intel x86 CPU 118 running a Windows operating system 114. Windows—Intel systems are commonly referred to as Wintel systems. Host system 110 also may run one or more personal authentication processes 111 such as fingerprint matching and one or more data security applications 113 such as one time password verification and antivirus. Host system 110 may further include credential storage 115 for storing cryptographic materials such as keys.

Low power host system 120 may be based on an ARM processor 128 running a separate operating system (e.g., Linux) 124. Low power host system 120 is designed to handle low power processing applications (e.g., e-mail, web browsing). This enables system 100 to extend the battery life of the system by running certain applications on the low power host processor instead of the higher power Windows host processor. Low power host system 120 may also run personal authentication processes 121 such as fingerprint matching.

Secure processing system 130 is designed to perform secure processing for system 100. Security processing system 130 (designated as unified security hub (USH) system) includes a credential vault 132 and a secure processor (USH) 134.

Systems, such as system 100, have several limitations. First, these systems expose security credentials and security processes/operations to open host resources. Therefore, sensitive security data and operations, particularly those on Host system 110, are exposed to Wintel based attacks. Additionally, security solutions are traditionally tied to a specific host. The dual host arrangement of system 100 requires two separate security schemes. This dual security scheme creates IT complexity because these two security schemes must be separately managed and increases the burden on user because a user must enroll credentials with each host, even though both hosts are included in the same system.

To address these issues, embodiments of the present invention isolate security from vulnerable host resources. These embodiments further make security services available to both hosts, thereby creating a consistent security scheme.

Figure 2:
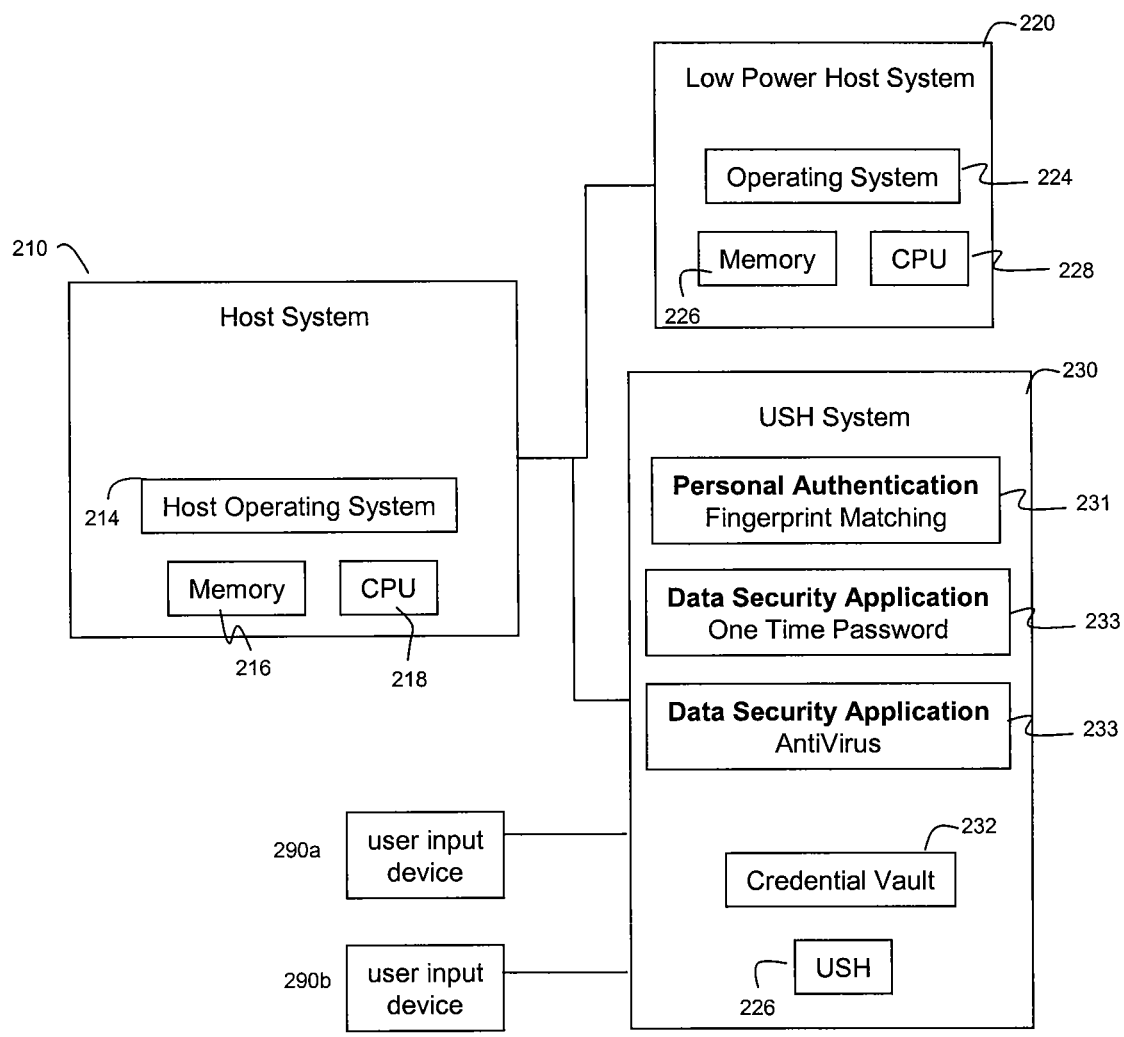
FIG. 2 depicts a system having host isolated security, according to embodiments of the present invention.

FIG. 2 depicts a multiple physical processor system 200 having host isolated security, according to embodiments of the present invention. System 200 isolates security applications from the multiple hosts of FIG. 1 and provides secure services to different physical machines.

System 200 includes three separate physical systems—host system 210 (e.g., normal windows processing), low power host system 220, and security processor system 230. In system 200, security related services are moved from the insecure host processing systems (210, 220) to the secure processing system 230. Secure processing system 230 is an adjunct processor that has the ability to store credentials and run application using those credentials. For example, secure processing system may support RSA one time password authentication, biometric authentication (e.g., fingerprint matching), and/or other forms of user authentication. In this way, sensitive data never has to leave the secure boundaries of the secure processor system 230.

As shown in FIG. 2, secure processing system (USH system) 230 includes personal authentication processes 231 such as fingerprint matching and data security applications 233. Secure processing system 230 may also include antivirus applications, facial recognition applications, and/or general purpose encryption. Secure processing system 230 also includes a credential vault 232 for secure storage of data such as cryptographic keys. As can be seen from FIG. 2, host system 210 and low power host system 220 no longer include any security related services or store any security related data.

In an embodiment, secure processor system 230 is directly connected to one or more user devices 290a to 290n. User device 290 may include a keyboard, a contactless smart card, a contacted smart card, or any other type of user input device. In this embodiment, when a user provides input via the user input device (e.g., types data using the keyboard), the secure processing system 230 makes a determination whether to send the data to the host. The direct connection to user devices may be utilized primarily (or solely) for user authentication. For example, if a user enters a password via the keyboard, the secure processing system 230 may keep the password data in the secure processing system and perform the user authentication within the secure processor. The secure processing system 230 may also determine whether to release the data input by the user to the host processor or the low power processor. In addition or alternatively, the secure processing system 230 may determine whether to encrypt the data input by the user prior to communication to the host processor or the low power processor.

1.2 Software Based USH

Figure 3:
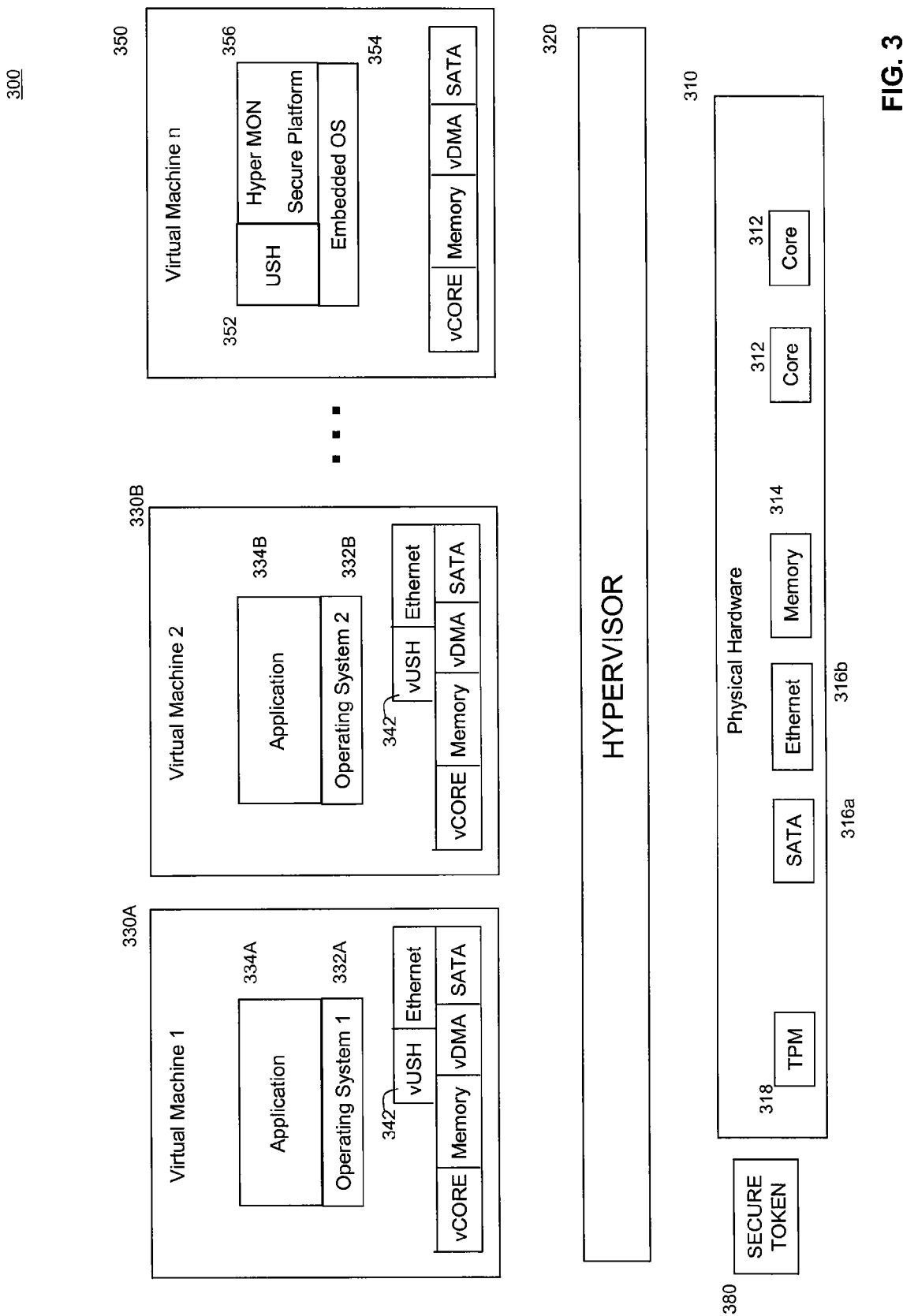
FIG. 3 depicts a block diagram of a system having a software based USH, according to embodiments of the present invention.

FIGS. 1 and 2 above depict the USH as a separate physical processor (e.g., a physical chip). In alternate embodiments, the USH may be entirely software based or partially software based. For example, in embodiments of the invention, the USH may run as a process on the host machine or run as a virtual machine. FIG. 3 depicts a block diagram of a system having a software based USH, according to embodiments of the present invention.

The exemplary system 300 of FIG. 3 includes a first virtual machine 330A, a second virtual machine 330B, an nth virtual machine 350, a hypervisor 320 (also referred to as a virtual machine manager), and a host system 310. Host system 310 includes one or more host processors 312, a host memory 314, and one or more additional hardware resources such as a serial AT attachment (SATA) 316a and Ethernet device 316b. Host system further includes a trusted platform module (TPM) 318.

Host processors 312 may comprise suitable logic, circuitry, and/or code that may enable control and/or management of the data processing and/or networking operations associated with host system 310. Host memory 314 may comprise suitable logic, circuitry, and/or code that may enable storage of data utilized by host system 310.

Trusted Platform Module (TPM) 318 is a secure cryptographic processor. For example, a TPM may be designed to meet the specifications defined by the Trusted Computing Group (TCG). TPM 318 may support authentication algorithms, encryption/decryption algorithms, random number generation, and secure key and data storage. For example, TPM 318 may be utilized to store cryptographic keys when the keys are at rest in the system.

At a high level, a virtual machine such as virtual machines 330A, 330B, and 350 are representations of a machine in software. A virtual machine provides hardware independence for an operating system and/or an application. Additionally, through the use of multiple virtual machines, applications (and/or operating systems) can be made independent and isolated from each other. In FIG. 3, virtual machines 330A and 330B include an operating system 332A, 332B and one or more application 334A, 334B. In embodiments, operating system 332A and/or operating system 332B are guest operating systems. A guest operating system is an operating system that would have run on a physical system separate from the hardware processor of system 300. Operating system 332A and operating system 332B may be the same operating system (e.g., Linux) or different operating systems (e.g., windows and Linux). Virtual machines 330A and 330B may also include virtualization of other hardware resources as depicted in FIG. 3.

Host system 310 may comprise suitable logic, circuitry, and/or code that may enable data processing and/or networking operations, for example. The host system 310 may support the operation of a first virtual machine (and first guest operating system), a second virtual machine (and second guest operating system), and an nth virtual machine via a hypervisor 320. The number of virtual machines or guest operating systems supported by the host system 320 need not be limited by the exemplary embodiment of FIG. 3. For example, two or more virtual machines and/or guest operating systems may be supported by host system 310.

Hypervisor 320 may operate as a software layer enabling operating system virtualization of hardware resources in the host system 310. Alternatively, a hypervisor 320 may operate as a software layer that enables virtualization of hardware resources coupled to the host system (shown in FIG. 4). The hypervisor may further enable data communication between virtual machines 330A, 330B, and 350 and the hardware resources of host system 310.

System 300 may also include a secure token 380. Secure token 380 may be a hardware peripheral device coupled to system 300. In an embodiment, secure token 380 is a USB dongle, smart card, or a similar device. The secure token 380 may be utilized with system 300 to provide secure storage for keys and/or data.

FIG. 3 depicts several levels of virtualization. As would be appreciated by a person of skill in the art, a system may support all levels of virtualization or a subset of the levels of virtualization depicted in FIG. 3. In one level of virtualization, virtual machine 1 330A and virtual machine 2 330B have I/O and virtualization of the USH. As depicted in FIG. 3, both virtual machine 1 330A and virtual machine 2 330B include vUSH 342. To support I/O and virtualization of the USH, system 300 may include USH hardware and software (not shown) in host system 310.

A second level of virtualization is the virtual USH of virtual machine n 350. Virtual machine 350 includes USH 352 running on an embedded operating system 354. USH 352 may include a software credential vault, authentication services, and/or other cryptographic services (e.g., encryption/decryption). In an embodiment, virtual machine n may include a hypervisor monitor 356. This second level of virtualization provides added security because the virtual USH is isolated from other processes. In embodiments of system 300 including only a virtual USH, credentials, keys, and/or other secure data are stored in whatever secure hardware is available on the machine (e.g., TPM 318 or secure token 380). When a process is started, the secure data is pulled directly from the secure storage (e.g., TPM or secure token) into the virtual USH. The secure data is not exposed to the insecure host system.

Like the hardware-based USH discussed above in FIG. 2, in an embodiment, the software-based USH (virtual USH of virtual machine n 350 or the virtualization of USH in virtual machines 1 and 2 330) is directly connected to one or more user devices (not shown). User devices may include a keyboard, a contactless smart card, a contacted smart card, or any other type of user input device. In this embodiment, when a user provides input via the user input device (e.g., types something using the keyboard), the software-based USH makes a determination whether to send the data to the host. The direct connection to user devices may be utilized primarily (or solely) for user authentication. For example, if a user enters a password via the keyboard, the software-based USH may keep the password data in the software-based USH and perform the user authentication within the security boundary of the software-based USH. The software-based USH may also determine whether to release the data input by the user to the host processor or the low power processor. In addition or alternatively, the software-based USH may determine whether to encrypt the data input by the user prior to communication to the host processor or the low power processor.

Figure 4:
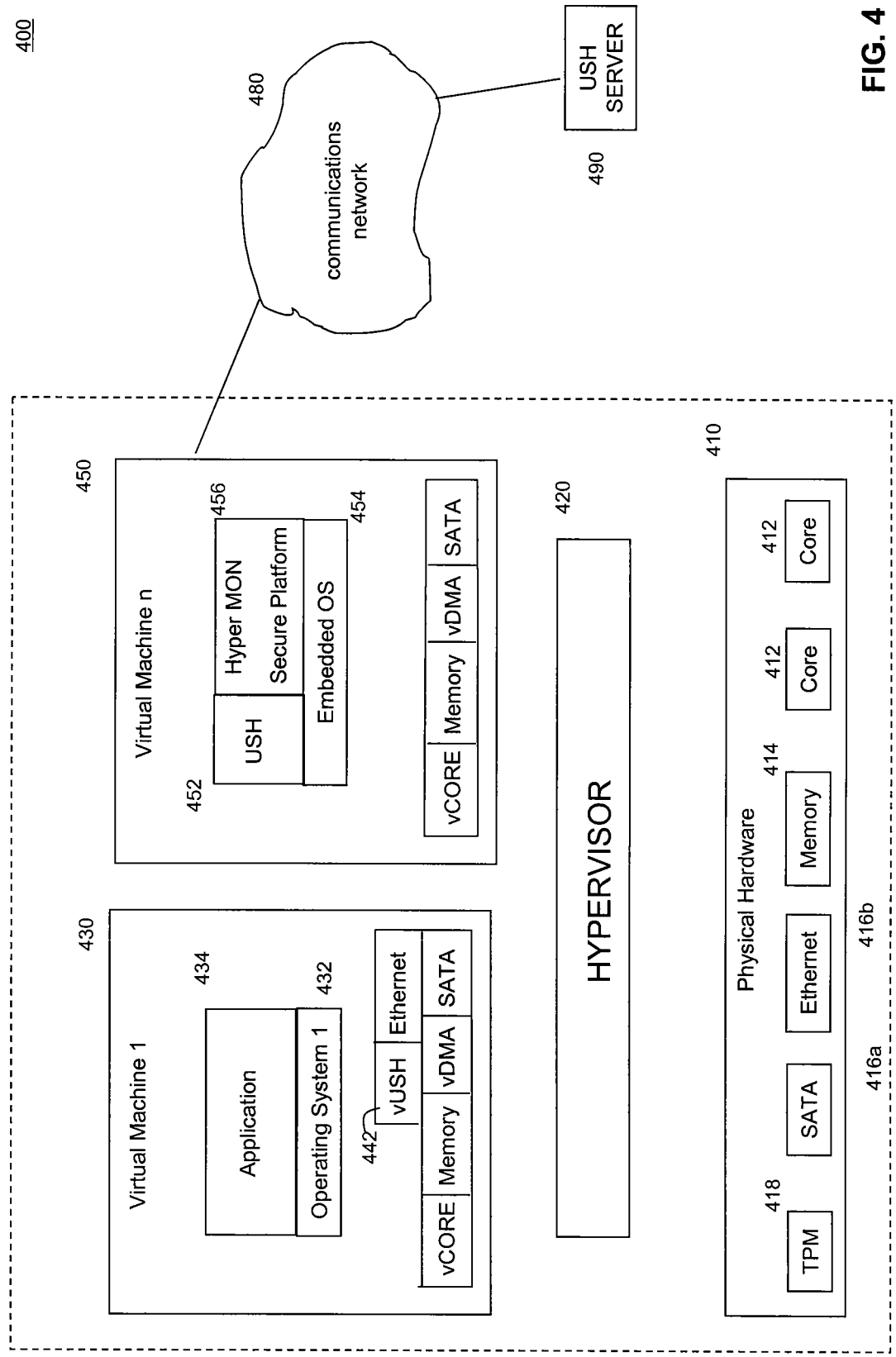
FIG. 4 depicts a block diagram of a server model for a system 400 having a software based USH, according to embodiments of the present invention.

FIG. 4 depicts a block diagram of a server model for a system 400 having a software-based USH, according to embodiments of the present invention. The exemplary system 400 of FIG. 4 includes a first virtual machine 430 and a second virtual machine 450, a hypervisor 420 (also referred to as a virtual machine manager), and a host system 410.

In embodiments of the invention, virtual machine 430, virtual machine 450, hypervisor 420, and host system 410 are included in the same physical machine. A server 490 is coupled to these components via a communications network 480. Server 490 is a USH server providing secure storage and secure processing services (including secure backup). In an embodiment, server 490 includes a hardware-based USH.

Host system 410 includes one or more host processors 412, a host memory 414, and one or more additional hardware resources such as SATA 416a and Ethernet device 416b. Host processors 412 may comprise suitable logic, circuitry, and/or code that may enable control and/or management of the data processing and/or networking operations associated with host system 410. Host memory 414 may comprise suitable logic, circuitry, and/or code that may enable storage of data utilized by host system 410.

In FIG. 4, virtual machine 430 includes an operating system 432 (such as Windows) and one or more applications 434. Virtual machine 430 may also include virtualization of other hardware resources as depicted in FIG. 4.

Host system 410 may comprise suitable logic, circuitry, and/or code that may enable data processing and/or networking operations, for example. The host system 410 may support the operation of a first virtual machine 430 (and first guest operating system) and a second virtual machine 450 via a hypervisor 420. The number of virtual machines or guest operating systems supported by the host system 420 need not be limited by the exemplary embodiment of FIG. 4.

In the embodiment of FIG. 4, hypervisor 420 operates as a software layer that enables virtualization of hardware resources of server 490 coupled to the host system. The hypervisor may further enable data communication between virtual machines 430 and 450 and the hardware resources of host system 410 and USH server 490.

FIG. 4 depicts several levels of virtualization. Virtual machine 430 has I/O and virtualization of the remote USH (depicted as vUSH in virtual machine 430). To support I/O and virtualization of the USH, system 400 includes USH hardware and software (not shown) in remote server 490. Virtual machine 450 includes USH 452 running on an embedded operating system 454. USH 452 may include a software credential vault, authentication services, and/or cryptographic services (e.g., encryption/decryption). In an embodiment, virtual machine 450 may include a hypervisor monitor 456.

2.0 Credential Vault API

Figure 5A:
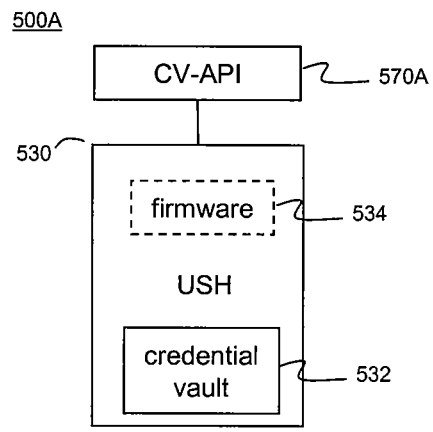
FIGS. 5A-5C depict block diagrams of systems including a credential vault API (CV-API), according to embodiments of the present invention.
Figure 5B:
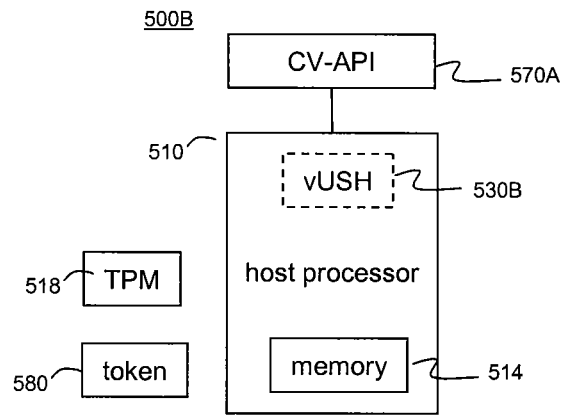
Figure 5C:
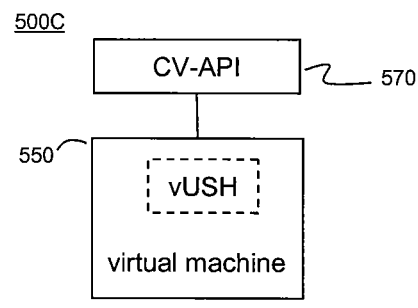

In embodiments of the present invention, an application programming interface (API), referred to as the credential vault API (CV-API), is included to make the platform of secure features and services offered by a unified security hub (USH) described above available to any application. FIGS. 5A-5C depict block diagrams of systems including a credential vault API (CV-API), according to embodiments of the present invention.

FIG. 5A depicts a high level block diagram of a system 500A having a CV-API 570A and a hardware-based USH 530, according to embodiments of the present invention. CV-API 570A provides an interface between software running on the host processor (e.g., x86 processor) and the physical USH chip 530. USH chip 530 includes firmware 534 providing a set of secure services and a secure credential vault 532.

FIG. 5B depicts a high level block diagram of a system 500B having a CV-API 570B and a USH running as a software process on the host processor 510, according to embodiments of the present invention. In this embodiment, the CV-API operates as an interface between software running on the host processor 510 and the USH software 530B. As described above, the USH may be provided as software running on the host processor. In this embodiment, the CV-API is an interface between another software application running of the host and the USH process running on the host. Secure data may be stored in system 500B in host processor memory 514, TPM 518, and/or a secure token 580.

FIG. 5C depicts a high level block diagram of a system 500C having a
CV-API 570C and a USH running as a virtual machine 550, according to embodiments of the present invention. Virtual machine 550 may be further protected by a hypervisor (not shown). System 500C may include a host processor 512C, a TPM 518, and/or a secure token 580.

Figure 6:
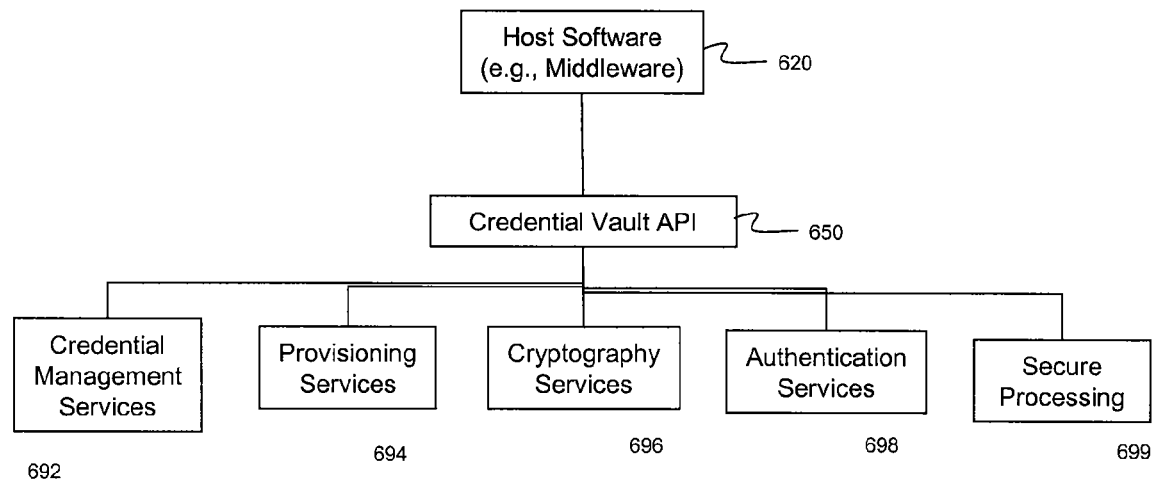
FIG. 6 depicts a high level block diagram of a system having a CV-API from the perspective of services exposed by the API, according to embodiments of the present invention.

FIG. 6 depicts a block diagram of a system 600 having a CV-API 650 from the perspective of services exposed by the CV-API, according to embodiments of the present invention. In system 600, CV-API 650 provides a unified interface to expose a suite of secure services and processing to multiple applications running on the host 620. In embodiments, applications 620 include middleware applications.

The suite of secure services may include credential management services 692, provisioning services 694, cryptography services 696, authentication services 698, and secure processing 699. Credential management services 692 and provisioning services 694 are described in further detail in the discussion of FIG. 7 below.

System 600 may expose a range of cryptographic services to applications 620 via CV-API 650. The cryptography services may include symmetric and/or asymmetric (public key) cryptography services. For example, cryptographic services may include block encryption/decryption (AES, DES, etc.), stream encryption/decryption (such as RC4), and/or other types of encryption/decryption as would be known to a person of skill in the art. The cryptography services may also include digital signature services and cryptographic hash services. In embodiments of the present invention, cryptography services also include key management services (e.g., key creation, key revocation, and key encryption).

System 600 may also expose a range of authentication services to applications 620 via CV-API 650. The authentication services include, but are not limited to, biometric authentication (e.g., fingerprint matching), cryptographic authentication (e.g., one time password authentication), and password matching. Authentication services may also support contacted smart card and contactless smart card application. For example, one such smart card application is a human interface device (HID) authentication. As would be appreciated by persons of skill in the art, other secure services may be exposed via CV-API 650. In embodiments of the present invention, the USH provides a common authentication engine for the other domains (e.g., virtual machines) in the system or device.

In the hardware-based USH embodiment of FIG. 5A, the security services of FIG. 6 are provided by firmware running on the USH. In the software-based USH embodiment of FIGS. 5B and 5C, the security services are provided by a USH software process.

Figure 7:
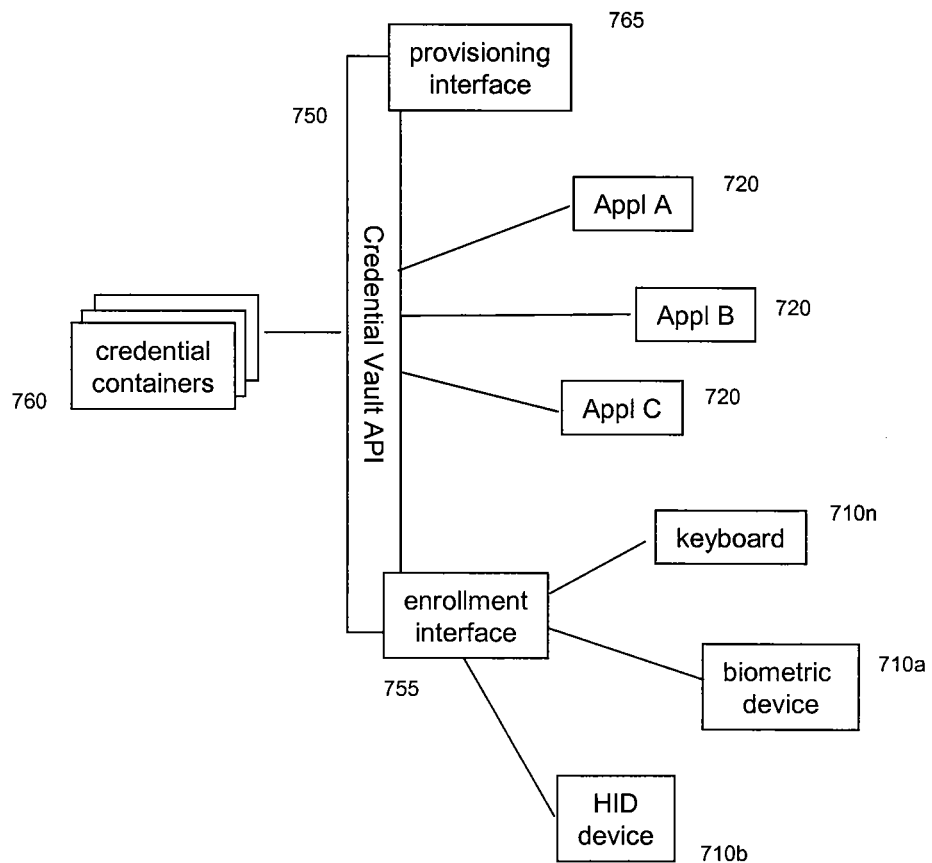
FIG. 7 depicts a block diagram of a system having a common CV-API from the perspective of credential use and management, according to embodiments of the present invention.

FIG. 7 depicts a block diagram of a system having a common CV-API 750 from the perspective of credential use and management, according to embodiments of the present invention. The CV-API 750 provides a centralized component for managing credentials for purposes of provisioning, enforcing policy and credential revocation. This centralized component allows the presentation of multiple credentials via a common interface to one or more applications.

Common CV-API 750 provides a common API for utilizing different types of and a variety of authentication devices 710a-n such as biometric devices, contactless devices, and keyboards (from password perspective). One or more authentication devices 710a-n may be implemented in multiple hardware chips (referred to as a bag of chips). CV-API 750 provides a common software API to pull these disparate hardware components together.

CV-API 750 provides a single place for enrollment of credentials. During the enrollment process, information is collected about the user. As depicted in FIG. 7, one or more hardware devices 710 may utilize CV-API 750 for credential enrollment. Enrollment may be provided via an enrollment interface 755. Enrollment interface may be a component of CV-API 750 or may be provided as a separate software module. Hardware devices 710 may be authentication devices including, but not limited to, a biometric device 710a (e.g., fingerprint), a contactless module, or a keyboard (e.g., from perspective of password entry). Once enrolled, the credentials can be requested by multiple applications.

CV-API 750 also provides a single place for provisioning of credentials. During the provisioning process, an application or device provisions one or more credentials to a credential container 760. The provisioning application or device may be a component of system 700 or may be external to system 700. Provisioning may be provided via a provisioning interface 765. Provisioning interface may be a component of CV-API 750 or may be provided as a separate software module.

Figure 8:
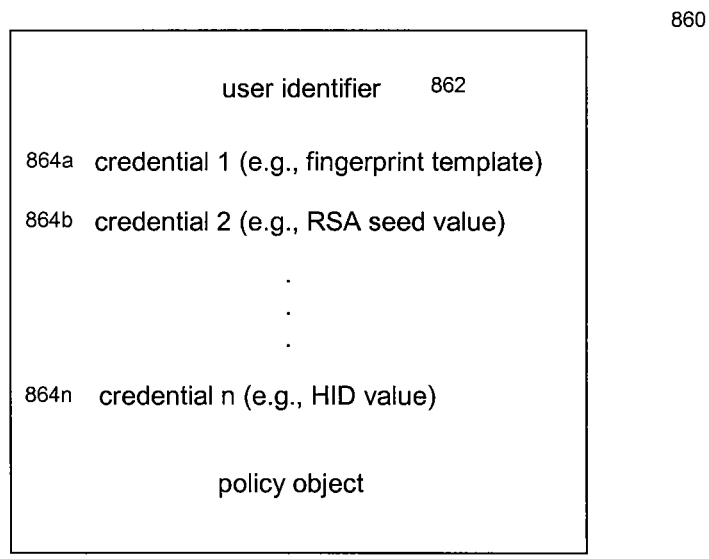
FIG. 8 depicts an exemplary credential container, according to embodiments of the present invention.

The enrolled and/or provisioned credentials are stored in credential containers 760. FIG. 8 depicts an exemplary credential container 860, according to embodiments of the present invention. A credential container includes an identifier 862 to identify the user associated with the credential. The credential container 860 includes also one or more credentials 864a-n (e.g., fingerprint template, RSA seed value, HID value) for the user. The credential container may also include or have associated with it a policy. The policy may be provided by a policy object. Policies can be defined for individual credentials, for a credential container, and/or for multiple credential containers. A policy can be used to define authentication and/or access control procedures to enforce for the credentials or a subset of the credentials.

A policy may be used to define what kind of authentication to apply and/or an access control list to apply for the credential. For example, a policy may define how to handle a credential depending on whether the system is provisioning or enrolling to hardware or software. In this example, the policy may allow the user to decrypt and read the user's personal e-mail from any system. However, the policy may restrict access to attachments to systems that have a piece of hardware to protect the keys that decrypt the attachment.

Credential containers may be stored in a USH credential vault. In embodiments of the present invention, credential vault may be implemented in hardware or software. In alternate embodiments, such as software based USH embodiments, credential containers may be stored in a TPM or a secure token.

Returning to FIG. 7, CV-API 350 further provides a common interface for the provisioning of one or more credentials to one or more applications 620a-n. As illustrated in FIG. 7, via the CV-API, a credential can be enrolled once and utilized by multiple applications. For example, a user can enroll his fingerprint template once and multiple applications (e.g., file access application, web site access application, and password manager application) can utilize the enrolled template for authentication via fingerprint matching.

As illustrated by the above embodiments, multiple (or all) authentication inputs into the system or device such as a keyboard, a biometric device, or a HID reader can be pulled into a common location for processing.

3.0 Exemplary Computer Implementation

Figure 9:
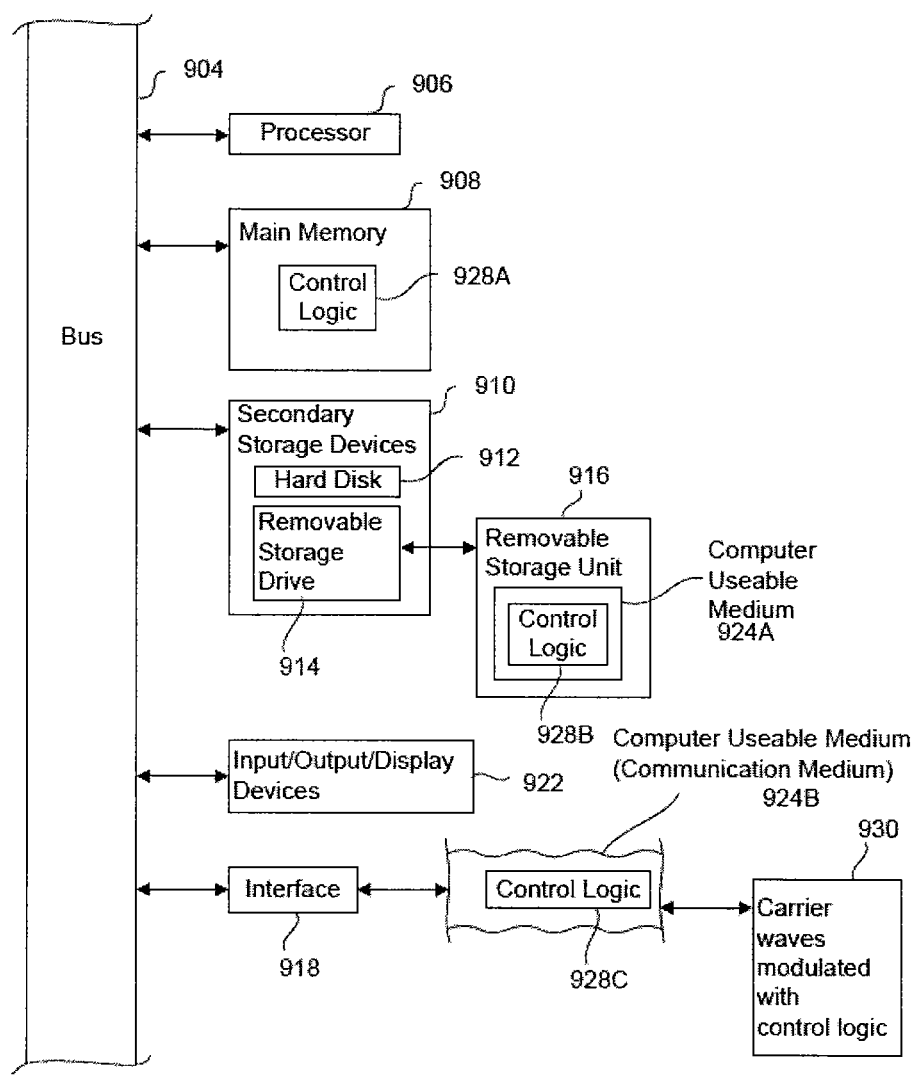
FIG. 9 illustrates an example computer system 900 in which embodiments of the present invention, or portions thereof, can be implemented as computer-readable code.

Various aspects of embodiments of the present invention can be implemented by software, firmware, hardware, or a combination thereof. FIG. 9 illustrates an example computer system 900 in which embodiments of the present invention, or portions thereof, can be implemented as computer-readable code. Various embodiments of the invention are described in terms of this example computer system 900. After reading this description, it will become apparent to a person skilled in the relevant art how to implement the invention using other computer systems and/or computer architectures.

Computer system 900 can be any commercially available and well known computer capable of performing the functions described herein, such as computers available from International Business Machines, Apple, Sun, HP, Dell, Compaq, Digital, Cray, etc.

The computer 900 includes one or more processors (also called central processing units, or CPUs), such as a processor 906. The processor 906 is connected to a communication bus 904.

The computer 900 also includes a main or primary memory 908, such as random access memory (RAM). The primary memory 908 has stored therein control logic 928A (computer software), and data.

The computer 900 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924A having stored therein computer software 928B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well known manner.

The computer 900 also includes input/output/display devices 922, such as monitors, keyboards, pointing devices, etc.

The computer 900 further includes a communication or network interface 918. The network interface 918 enables the computer 900 to communicate with remote devices. For example, the network interface 918 allows the computer 900 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from the computer 900 via the communication medium 924B. More particularly, the computer 900 may receive and transmit carrier waves (electromagnetic signals) modulated with control logic 930 via the communication medium 924B.

Any apparatus or manufacture comprising a computer useable or readable medium having control logic (software) stored therein is referred to herein as a computer program product or program storage device. This includes, but is not limited to, the computer 900, the main memory 908, the secondary storage devices 910, the removable storage unit 916 and the carrier waves modulated with control logic 930. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

4.0 Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A secure processing system comprising:
    a host processor;
    a virtual machine instantiated on the host processor;
    a virtual unified security hub (USH) instantiated on the virtual machine, wherein the virtual USH emulates a hardware-based USH and provides a plurality of security services to an application executing on the host processor; and
    a plurality of authentication input devices coupled to the virtual USH, wherein each of the plurality of authentication input devices are included in a separate integrated circuit chip coupled to the host processor;
    wherein the virtual machine includes an application programming interface (API) configured to expose the plurality of secure services provided by the virtual USH to the application and the API is configured to provide, to a plurality of applications, a unified interface for enrolling or provisioning a user credential in a credential container.

2. The secure processing system of claim 1, wherein the secure processing system includes a USH processor coupled to the host processor.

3. The secure processing system of claim 1, wherein the secure processing system includes a USH processor coupled to the host processor over a communications network.

4. The secure processing system of claim 1, wherein the secure processing system includes a USH processor coupled to the host processor via a hardware token.

5. The secure processing system of claim 1, further comprising:
    a user input device coupled to the virtual USH, wherein input data entered by the user input device is received at the virtual USH directly from the user input device.

6. The secure processing system of claim 5, wherein the virtual USH is configured to determine whether to release the input data to the host processor.

7. The secure processing system of claim 5, wherein the virtual USH is configured to encrypt the input data prior to release to the host processor.

8. The secure processing system of claim 5, wherein the user input device is a keyboard.

9. The secure processing system of claim 5, wherein the user input device is a biometric authentication device.

10. The secure processing system of claim 5, wherein the user input device is a smart card containing user authentication data.

11. The secure processing system of claim 1, further comprising:
    a secure storage.

12. The secure processing system of claim 11, wherein the virtual USH obtains data from the secure storage and stores data to the secure storage.

13. The secure processing system of claim 11, wherein the secure storage is a trusted platform module.

14. The secure processing system of claim 11, wherein the secure storage is a hardware token.

15. The secure processing system of claim 1, further comprising:
    a plurality of additional virtual machines instantiated on the host processor, wherein the virtual USH provides a common authentication engine for each of the plurality of additional virtual machines.

16. The secure processing system of claim 1, wherein the plurality of applications includes a plurality of authentication applications.

17. The secure processing system of claim 16, wherein an authentication input for the plurality of authentication applications is provided by a contactless smart card.

18. The secure processing system of claim 16, wherein an authentication input for the plurality of authentication applications is provided by a contacted smart card.

19. The secure processing system of claim 1, wherein an application in the plurality of applications is executing on a processor external to the secure processing system.

20. The secure processing system of claim 1, wherein the credential container includes the user credential and an associated security policy.

21. The secure processing system of claim 1, wherein the API is further configured to make the credential container including an enrolled credential for a user available to a plurality of applications executing on the host processor.

22. The secure processing system of claim 1, wherein the user credential includes a biometric template.

23. The secure processing system of claim 22, wherein the biometric template is a fingerprint template.

24. The secure processing system of claim 1, wherein the user credential includes a human interface device identifier.

25. The secure processing system of claim 1, wherein an application in the plurality of applications is executing on a processor external to the secure processing system.

26. The secure processing system of claim 1, wherein the credential container includes the user credential and an associated security policy.

27. The secure processing system of claim 1, wherein the API is further configured to make the credential container including a provisioned credential for a user available to a plurality of applications executing on the host processor.

28. The secure processing system of claim 1, wherein the plurality of security services includes data encryption.

29. The secure processing system of claim 1, wherein the plurality of security services includes user authentication.

30. The secure processing system of claim 29, wherein the plurality of security services includes fingerprint matching.

31. The secure processing system of claim 1, wherein the plurality of security services includes an antivirus application.

32. A secure processing system comprising:
a host processor;
a low power host processor coupled to the host processor; and
a unified security hub (USH) processor coupled to the host processor and the low power host processor, wherein the USH processor is configured to provide a plurality of security services to the host processor and the low power host processor, and wherein the plurality of security services are isolated from the host processor and the low power host processor.

33. The secure processing system of claim 32, wherein the USH processor includes an application programming interface (API) configured to expose a plurality of secure services provided by the USH processor to a plurality of applications executing on the host processor.

34. The secure processing system of claim 32, further comprising a virtual machine instantiated on the host processor, wherein the virtual machine includes an application programming interface (API) configured to expose a plurality of secure services provided by the USH processor to a plurality of applications executing on the low power host processor.

35. The secure processing system of claim 32, wherein the USH processor includes an application programming interface (API) configured to provide, to a plurality of applications, a unified interface for enrolling a user credential in a credential container.

36. The secure processing system of claim 35, wherein the plurality of applications includes a plurality of authentication applications.

37. The secure processing system of claim 36, wherein the plurality of authentication applications are each included in a separate integrated circuit chip coupled to the host processor.

38. The secure processing system of claim 36, wherein an authentication application in the plurality of authentication applications is provided by a contactless smart card.

39. The secure processing system of claim 36, wherein an authentication application in the plurality of authentication applications is provided by a contacted smart card.

40. The secure processing system of claim 35, wherein an application in the plurality of applications is executing on a processor external to the secure processing system.

41. The secure processing system of claim 35, wherein the credential container includes the user credential and an associated security policy.

42. The secure processing system of claim 41, wherein the user credential includes a biometric template.

43. The secure processing system of claim 42, wherein the biometric template is a fingerprint template.

44. The secure processing system of claim 35, wherein the API is further configured to make the credential container including an enrolled credential for a user available to a plurality of applications executing on the host processor.

45. The secure processing system of claim 35, wherein the user credential includes a biometric template.

46. The secure processing system of claim 45, wherein the biometric template is a fingerprint template.

47. The secure processing system of claim 35, wherein the user credential includes a human interface device identifier.

48. The secure processing system of claim 32, further comprising:
a plurality of virtual machines instantiated on the host processor, wherein the USH processor provides a common authentication engine to each of the plurality of virtual machines.

49. The secure processing system of claim 32, wherein the USH processor provides a common authentication engine for an application executing on the host processor and an application executing on the low power host processor.

50. The secure processing system of claim 32, wherein the USH processor includes an application programming interface (API) configured to provide, to a plurality of applications, a unified interface for provisioning a user credential to a credential container.

51. The secure processing system of claim 50, wherein an application in the plurality of applications is executing on a processor external to the secure processing system.

52. The secure processing system of claim 50, wherein the credential container includes the user credential and an associated security policy.

53. The secure processing system of claim 50, wherein the API is further configured to make the credential container including a provisioned credential for a user available to a plurality of applications executing on the host processor.

54. The secure processing system of claim 32, wherein the plurality of security services includes data encryption.

55. The secure processing system of claim 32, wherein the plurality of security services includes user authentication.

56. The secure processing system of claim 32, wherein the plurality of security services includes fingerprint matching.

57. The secure processing system of claim 32. wherein the plurality of security services includes an antivirus application.

58. The secure processing system of claim 32, further comprising:
a user input device coupled to the USH processor, wherein input data entered by the user input device is received at the USH processor directly from the user input device.

59. The secure processing system of claim 58, wherein the USH processor is configured to determine whether to release the input data to the host processor.

60. The secure processing system of claim 58, wherein the USH processor is configured to encrypt the input data prior to release to the host processor.

61. The secure processing system of claim 58, wherein the user device is a keyboard.

62. The secure processing system of claim 58, wherein the user device is a biometric authentication device.

63. The secure processing system of claim 58, wherein the user device is a smart card containing user authentication data.

* * * * *